July 6, 1954  J. L. HARTMAN  2,683,067
TILTABLE TABLE OF CANTILEVER TYPE
Filed April 23, 1953
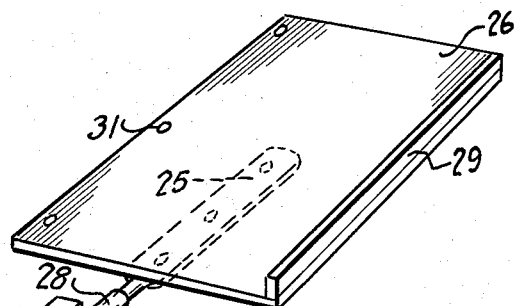
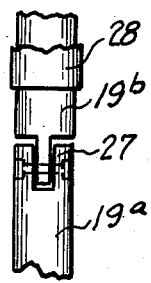
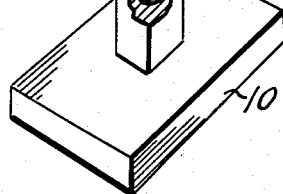
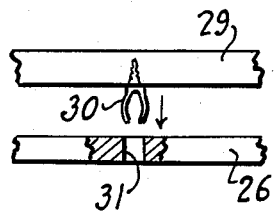
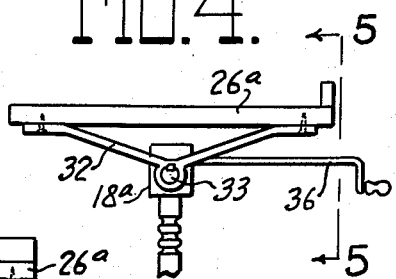
Inventor
Joseph L. Hartman
By
Attorney Patented July 6, 1954

2,683,067

UNITED STATES PATENT OFFICE 2,683,067

TILTABLE TABLE OF CANTILEVER TYPE

Joseph L. Hartman, Toledo, Ohio

Application April 23, 1953, Serial No. 350,546

1 Claim. (Cl. 311—37)

This invention relates to tables but particularly to adjustable tables and an object is to produce a new and improved universally adjustable table, particularly although not exclusively adapted as a support for heavy books, such as dictionaries, encyclopedias and the like.

Other objects will hereinafter appear and for purpose of illustration but not of limitation, embodiments of the invention are shown in the accompanying drawings in which:

Figure 1 is a perspective view of a universally adjustable table;

Figure 2 is a fragmentary view of the hinge connection between the panel supporting shaft sections;

Figure 3 is a fragmentary elevation of the panel and ledge parts, showing the connection therebetween;

Figure 4 is a fragmentary side elevation of an alternate form in which the supporting panel is arranged directly above and coextensive with the shaft; and Figure 5 is an elevation substantially on the line 5—5 of Figure 4.

The illustrated embodiment of the invention comprises a universally adjustable table having a relatively heavy base or pedestal 10 to which is fixed an upright column 11 which in this instance is square in cross section and has a cylindrical socket 12 open at the upper end. In the bottom of the socket 12 is a counterbalancing coil spring 14, on the upper end of which is adapted to rest a post 13, the lower end portion of which is cylindrical to slide and rotate within the socket 12. Since the post is free to move vertically in the socket 12, the coil spring 14 should be of sufficient strength to support or counterbalance the normal weight of the superstructure. Formed in the upper portion of the post 13 is a series of vertically spaced annular grooves 15. Depending upon the height desired for the post 13 relative to the column 11, a thumb screw 16 is screwed into a selected groove 15, thereby to lock the post in the adjusted vertical position. The thumb screw 16 is carried by a tubular sleeve or extension 17, which is suitably fixed to the upper end of the column 11.

Fixed to the upper end of the post 13 is a bearing block 18 of any suitable material and having bearing therein is a horizontally disposed rotatable shaft 19. The shaft 19 extends through the bearing block 18 and has a worm wheel 20 fixed to the outer end thereof. The worm wheel 20 meshes with a worm gear 21, which is rigid with a horizontally disposed shaft 23 rotatably mounted in brackets 22 carried by the bearing block 18. On the outer end of the shaft 23 is a crank handle 24 for manually operating the gears, thereby to rock the shaft 19 in one direction or the other for adjusting the position of the supporting panel, as will hereinafter appear.

On the opposite end of the shaft 19 is a flattened portion 25, to which is fixed a supporting panel 26 adapted to support objects such for example as relatively large heavy books, such as dictionaries, encyclopedias etc. By operating the crank handle 24 it is clear that the supporting panel 26 may be tilted in one direction or the other.

In order to enable the supporting panel 26 to be dropped downwardly along side of the column 11 so that the table does not occupy so much space when not in use, the shaft 19 is in two sections, as shown on Figure 2. The shaft section 19a and the section 19b are pivotally connected together by a suitable connection 27, the connection being such that when the parts are in alignment there are no projecting elements. Slidable on the shaft sections is an elongate sleeve 28, which is slid over the pivotal connection to hold parts in alignment. By sliding the sleeve 28 to uncover the pivotal connection, then the panel 26 may be swung downwardly as above indicated.

For holding books or the like on the panel 26 when the latter is tilted, a ledge strip 29 is provided and, as shown, this strip is of the same length as that of the panel 26. As shown in Figure 3 the under side of the ledge strip 29 is provided with a plurality of fastening devices 30 in the form of spring fingers, which are adapted to be forced into holes 31 in the panel 26. This provides a convenient means of attachment and enables the ledge strip to be readily removed and placed on the other side of the supporting panel when desired, holes being provided in opposite sides of the supporting panel for this purpose.

In the alternate form shown on Figures 4 and 5, the supporting panel 26a has brackets secured to the under side thereof adjacent opposite ends, and the opposite ends of a shaft 33 is disposed beneath the panel 26a approximately midway of the width of the panel. The shaft 33 extends through and has bearing in a bearing block 18a and a worm wheel 34 is fixed to the shaft adjacent the bearing block. A worm gear 35 meshes with the wheel 34 and has a crank handle shaft 36. The remainder of the structure is similar to that above described. However it will be understood that by rotating the handle 36 in one direction or the other, the supporting panel 26a is tilted to one side or the other of the bearing block 18a.

From the above description it will be apparent that I have produced an exceedingly simple table which can be universally adjusted. It can be readily adjusted from a height stand point by manipulation of the thumb screw 16 and raising or lowering the post 13. By manually operating the crank handle 24, the supporting panel may be conveniently tilted to the desired angle or position. In the form shown on Figure 1, the panel may be swung downwardly along side of the upright column 11 so that the table can be stored when not in use. When in use the table may project over a chair or bed in a position convenient to the user. In the form shown in Figures 4 and 5 the supporting panel is somewhat differently arranged with respect to the supporting standard but the features of universal adjustment are inherent in this form also.

Numerous changes in details of construction and arrangement and operation may be effected without departing from the spirit of the invention especially as defined in the appended claim.

What I claim is:

A tiltable table of cantilever type comprising a vertical supporting post, a mounting for said post, a bearing block rigid with the upper end of said post and having a transverse bearing, a horizontally disposed two-part shaft, one shaft part being rotatable in said transverse bearing, a horizontally disposed table top arranged at one side of and spaced from said supporting post, a rigid connection between the other shaft part and said table top, a pivotal connection between the adjacent ends of said shaft parts enabling the table top to swing downwardly to a position generally parallel to said supporting post, said pivotal connection being disposed in the space between the post and the adjacent edge of the table top, a sleeve slidable on said shaft to cover the pivotal connection or to free such connection to enable downward swinging of the table top, a worm wheel on the shaft part adjacent the bearing block, a worm gear meshing with the worm wheel, a shaft for the worm gear, bearing brackets on the block for said shaft, and a crank handle for said shaft whereby manual turning of the crank handle tilts the table and the same is retained in adjusted position by the worm gears.

References Cited in the file of this patent

UNITED STATES PATENTS

| Number | Name | Date |
|---|---|---|
| 118,991 | Welch et al. | Sept. 12, 1871 |
| 525,554 | Koehler et al. | Sept. 4, 1894 |
| 745,160 | Cummings | Nov. 24, 1903 |
| 817,634 | Fagerstorm | Apr. 10, 1906 |
| 1,117,062 | Labedzki | Nov. 10, 1914 |
| 1,267,812 | Smith | May 28, 1918 |
| 1,807,500 | West | May 26, 1931 |
| 1,936,529 | Taylor | Nov. 21, 1933 |
| 1,963,897 | Greville | June 19, 1934 |
| 2,628,142 | Dubach | Feb. 10, 1953 |